(12) United States Patent
Maruyama

(10) Patent No.: US 7,974,004 B2
(45) Date of Patent: Jul. 5, 2011

(54) SCREEN

(75) Inventor: Masato Maruyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 64 days.

(21) Appl. No.: 12/546,770

(22) Filed: Aug. 25, 2009

(65) Prior Publication Data

US 2010/0053747 A1   Mar. 4, 2010

(30) Foreign Application Priority Data

Aug. 29, 2008 (JP) ................................. 2008-221048

(51) Int. Cl.
*G03B 21/56* (2006.01)

(52) U.S. Cl. ............. 359/443; 160/351; 40/603; 40/610

(58) Field of Classification Search .................. 359/443, 359/461; 396/3; 160/351, 24; 40/603, 610
See application file for complete search history.

(56) References Cited

U.S. PATENT DOCUMENTS

| | | | | |
|---|---|---|---|---|
| 4,017,152 A | * | 4/1977 | Allen | 359/443 |
| 4,068,673 A | * | 1/1978 | Bernardi | 160/24 |
| 4,708,189 A | * | 11/1987 | Ward | 160/351 |
| 5,373,863 A | * | 12/1994 | Prizio | 160/351 |
| 6,928,904 B2 | * | 8/2005 | Hsien | 81/60 |
| 2006/0077356 A1 | | 4/2006 | Merczak | |

FOREIGN PATENT DOCUMENTS

| | | |
|---|---|---|
| JP | 64-49929 U | 3/1989 |
| JP | 2003-315920 A | 11/2003 |

* cited by examiner

*Primary Examiner* — Christopher Mahoney
(74) *Attorney, Agent, or Firm* — AdvantEdge Law Group, LLC

(57) ABSTRACT

A screen includes: the four arm members have first connection sections, one at each of the first and second support section side extremities, each of the first and second support sections includes at either extremity thereof a second connection section which receives the first connection section, an attachment and detachment of each of the arm members to and from the screen main body is carried out by an attachment and detachment of the first connection section to and from the second connection section, each of the four arm members has a third connection section at the support rod side extremity, the support rod has fourth connection sections which receive, one each, the four arm members, and an attachment and detachment of the arm members to and from the support rod is carried out by the third connection sections and fourth connection sections coming into engagement.

4 Claims, 10 Drawing Sheets

SCREEN

The entire disclosure of Japanese Patent Application No. 2008-2210148, filed Aug. 29, 2008, is expressly incorporated by reference herein.

BACKGROUND

1. Technical Field

The present invention relates to a screen.

2. Related Art

To date, a screen has been known which is used by supporting four corners of a screen main body having flexibility and thereby tautening the screen main body. This kind of screen, being a portable screen, is configured of, for example, a screen main body, members which tauten the screen main body, a legged support, and the like, and the screen is disassembled, and transported (carried by hand) or stored. At the time of use, the screen is assembled and used by a user.

JP-A-2003-315920 discloses a portable screen apparatus which, including a storage section, four extensible units which retractably extend in four directions from a peripheral edge of the storage section, and a screen which can be folded into an optional shape with corners thereof detachably attached to the leading extremities of the extendable units, is configured in such a way that the extendable units, when extended, stretch the screen into a planar form.

However, with the portable screen apparatus described in JP-A-2003-315920, there has been a problem in that configurations of the storage section and extendable units are likely to be complex, and that a screen main body easily forms a crease due to its being transported or stored in a folded form, and the like. Also, in the same kind of portable screen apparatus, there has been a problem in that the disassembled screen main body is likely to become curled due to its being transported or stored in a rolled form. When this kind of screen is stretched, there has been a problem in that, due to the effect of the crease, curl, or the like, wrinkles (concavities and convexities) are likely to occur on a surface of the screen main body, and the flatness of the surface is also lowered. Consequently, a screen has been demanded which, when the screen main body is stretched, reduces wrinkles and improves the flatness with a simple configuration.

SUMMARY

The invention can be realized as the following aspect or application example.

A screen according to an aspect of the invention includes a screen main body onto which an image light is projected; arm members which, being for holding the screen main body in a stretched condition, extend from a support rod to both extremities of each of a first and second support member; and a first and second support section which regulate and support both parallel extreme sections of the screen main body in a horizontal or vertical direction.

According to this kind of configuration, when the screen main body is stretched by using the arm members to tauten the screen main body, the support sections regulate and support both opposed extreme sections of the screen main body. By means of these kinds of support section, it being possible to reduce an occurrence of wrinkles due to a crease of the screen main body, it is possible to improve flatness. Particularly, to date, as the screen main body has been likely to have a crease or curl at its extremities, the flatness at the extremities of the screen main body has particularly been lowered. In response to this, by the support sections supporting both opposed extreme sections of the screen main body, it is possible to improve the flatness at the extremities. Also, by the support section supporting both opposed extreme sections of the screen main body, it being possible to uniformly tauten the whole of the surface of the screen main body, it is possible to improve the flatness in comparison with a heretofore known case.

It is preferable that first connection sections are provided one at each of the first and second support section side extremities of the arm members, each of the first and second support sections includes at either extremity thereof a second connection section which receives the first connection section, and an attachment and detachment of the arm members to and from the screen main body is carried out by an attachment and detachment of the first connection section to and from the second connection section.

According to this kind of configuration, by means of a simple operation such as the attachment and detachment of the first connection section provided at the first support section side or second support section side extremity of each arm member to and from each of the second connection sections provided in the first and second support section, it is possible to carry out the attachment and detachment of the arm members to and from the screen main body. For example, by connecting the first connection sections and second connection sections in engagement with each other, it is possible to tauten and stretch the screen main body while reducing an occurrence of wrinkles. Also, by bringing them out of engagement with each other, it is possible to remove (separate) the screen main body from the arm members.

Also, it is preferable that each of the first connection sections has a first spring member which biases the main body of the first connection section in a direction along the arm member from the first or second support side extremity of the arm member.

According to this kind of configuration, by the first connection section having the first spring member which enables the first connection section main body to protrude by biasing the first connection section main body in the direction along the arm member from the first or second support section side extremity of the arm member, it is possible for the first connection section to further tauten the screen main body. By this means, it being possible to further reduce an occurrence of wrinkles due to a crease or curl of the screen main body, it is possible to further improve the flatness.

Also, it is preferable that there is provided a support rod disposed in a central portion of the screen main body, each of the arm members has a third connection section at the support rod side extremity, the support rod has fourth connection sections which receive, one each, the arm members, and an attachment and detachment of the arm members to and from the support rod is carried out by the third connection sections and fourth connection sections coming into engagement.

According to this kind of configuration, also, the third connection sections included at the support rod side extremities of the arm members, by being brought into engagement with the fourth connection sections of the support rod, are fixed to the support rod. By this means, it is possible to securely fix the support rod side extremities of the arm members by securely supporting them on the support rod. Also, it is possible to remove (separate) the arm members from the support rod.

Also, it is preferable that each of the third connection sections has a concavity, and each of the fourth connection sections has a second spring member on which is formed a convexity which comes into engagement with the concavity.

According to this kind of configuration, by utilizing the springiness of the second spring member included in the fourth connection section to bring the convexity formed on the second spring member into engagement with the concavity included in the third connection section, it is possible to securely fix the arm members to the support rod (or arm support sections provided on the support rod) with a simple configuration. Conversely, it is possible to easily remove the arm members from the support rod (or the arm support sections provided on the support rod). By this means, it is possible to reliably carry out an attachment and detachment of the arm members to and from the support rod (or an arm fixing section provided on the support rod) with a simple configuration.

Also, it is preferable that each of the third connection sections has a third spring member on which a convexity is formed, and each of the fourth connection sections has a concavity which comes into engagement with the convexity.

According to this kind of configuration, by utilizing the springiness of the third spring member included in the third connection section to bring the convexity formed on the third spring member into engagement with the concavity included in the fourth connection section, it is possible to securely fix the arm members to the support rod (or the arm support sections provided on the support rod) with a simple configuration. Conversely, it is possible to easily remove the arm members from the support rod (or the arm support sections provided on the support rod). By this means, it is possible to reliably carry out the attachment and detachment of the arm members to and from the support rod (or the arm fixing section provided on the support rod) with a simple configuration.

Also, it is preferable that the screen includes a legged support which, abutting against an installation surface on which the screen is installed, has legs which, being connected to the support rod, support the screen upright.

According to this kind of configuration, the screen includes the legged support which, having the legs, is connected to the support rod. By this means, the legs abut against the installation surface and, by supporting the screen upright, it is possible to maintain a condition in which the screen is stably installed.

BRIEF DESCRIPTION OF THE DRAWINGS

The invention will be described with reference to the accompanying drawings, wherein like numbers reference like elements.

FIGS. 4A and 4B are schematic fragmentary sectional views of the arm fixing section, wherein FIG. 4A is a sectional view showing a condition in which a third arm member is in the process of being attached to the arm fixing section, while FIG. 4B is a sectional view showing a condition in which the attachment of the third arm member to the arm fixing section is completed.

DESCRIPTION OF EXEMPLARY EMBODIMENTS

Hereafter, a description will be given of an embodiment, based on the drawings.

Embodiment

Figure 1:
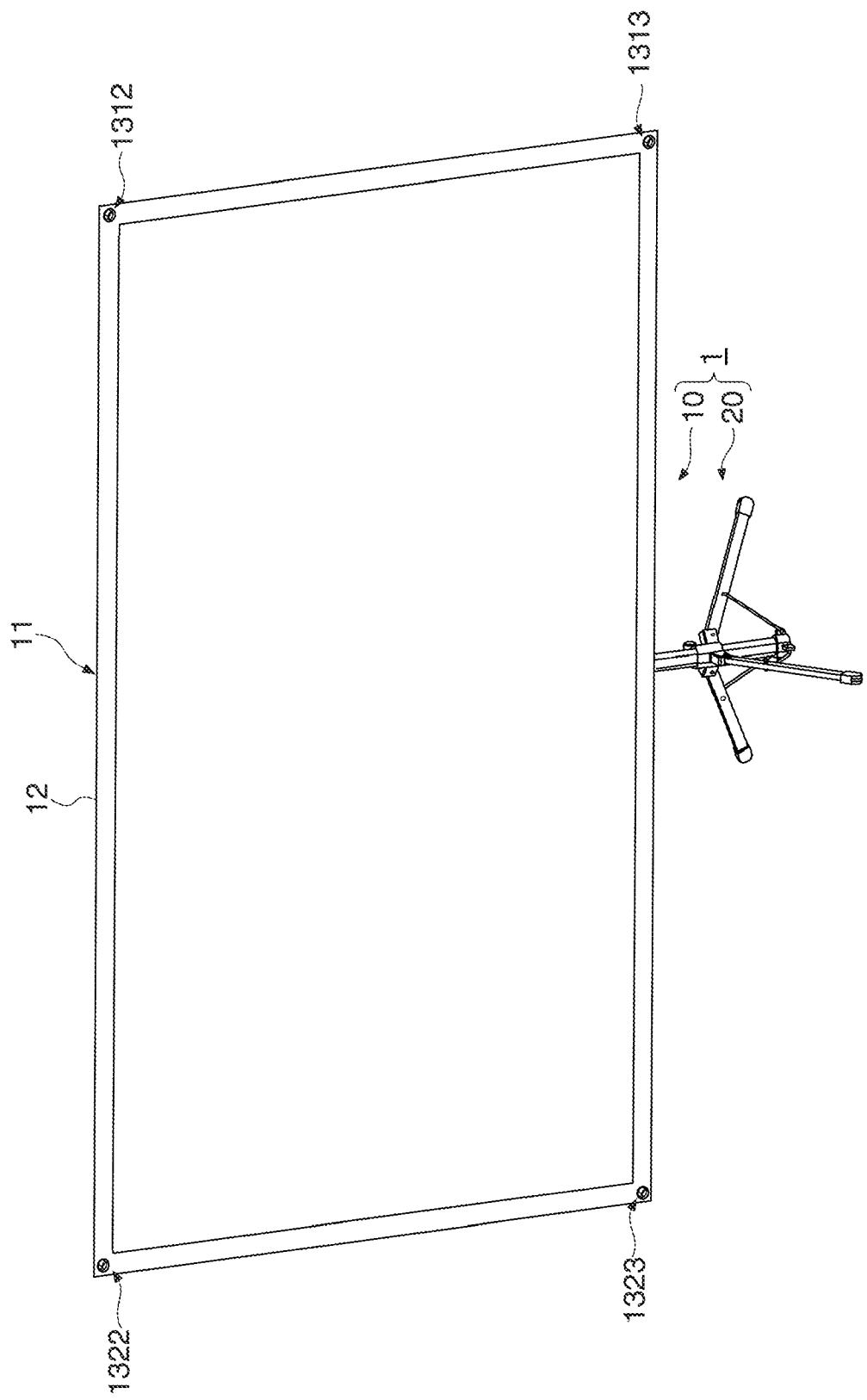
FIG. 1 is a perspective view showing an outline configuration of a screen according to an embodiment.
Figure 2:
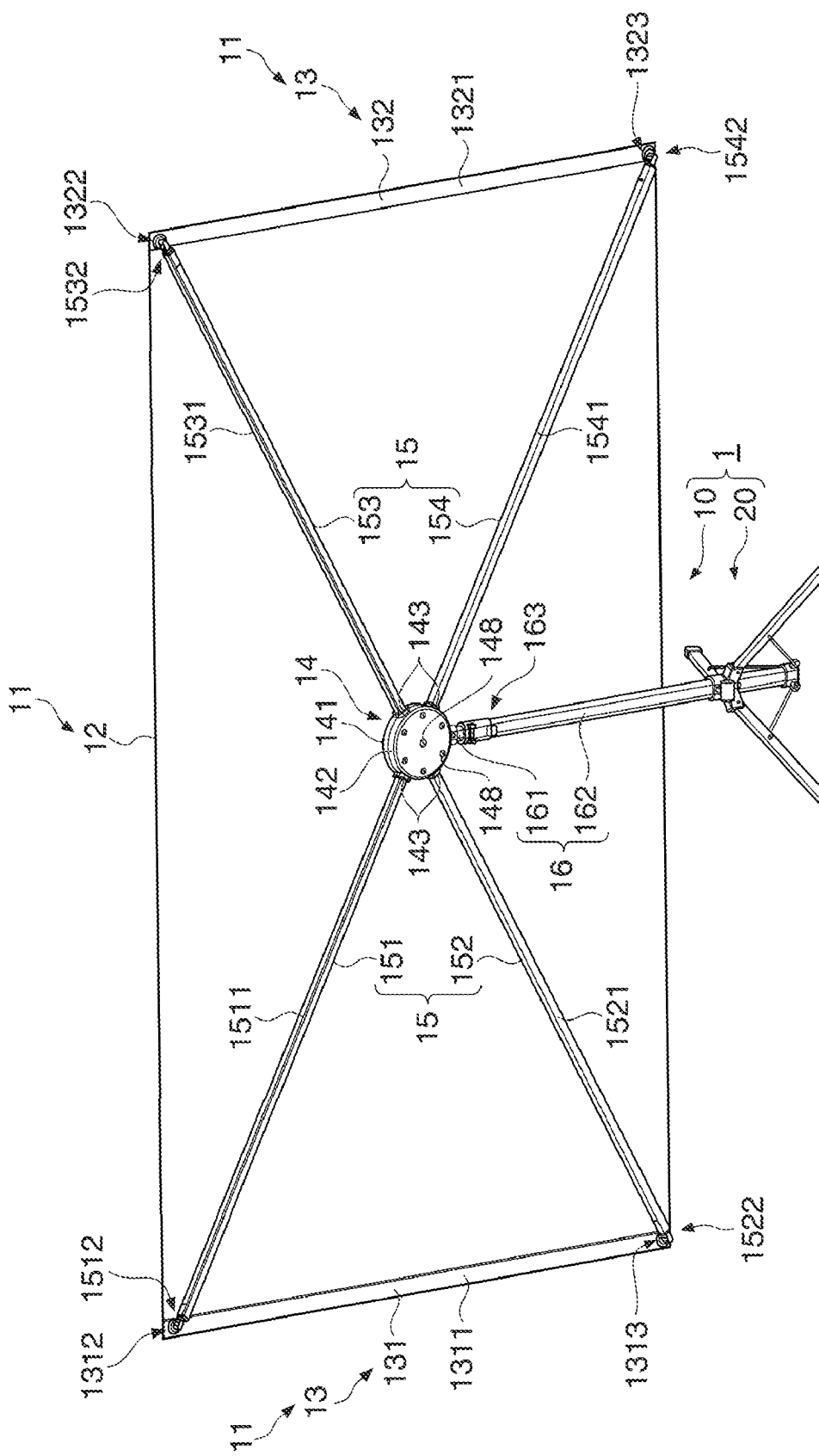
FIG. 2 is a perspective view showing an outline configuration of the screen.

FIGS. 1 and 2 are perspective views showing an outline configuration of a screen according to this embodiment. FIG. 1 is a perspective view of the screen 1 seen from the front surface side on which an image light falls incident. FIG. 2 is a perspective view of the screen 1 seen from the rear surface side. A description will be given, referring to FIGS. 1 and 2, of the screen 1. "Left" and "right", to be described hereafter, mean left and right when seen from the rear surface side of the screen 1.

An image light projected and enlarged from, for example, an unshown projector is projected onto the screen 1. The screen 1 is roughly configured of an image projection section 10 and a legged support 20, as shown in FIGS. 1 and 2.

As shown in FIG. 2, the image projection section 10 includes a screen main body 12, which is a portion onto which the image light is projected, support sections 13 installed in two opposed extreme sections of the screen main body 12, an arm fixing section 14, arm members 15, and a support rod 16. Also, the screen main body 12, having flexibility, and being formed into a sheet, is configured as a reflective screen which reflects an image light falling incident on the front surface side, causing a display thereof. Also, a screen section 11 is configured of the screen main body 12 and support sections 13.

As shown in FIG. 2, the support sections 13, in the embodiment, extend along both lateral extreme sections on the rear surface side of the screen main body 12, and are formed into approximately rectangular plates, supporting both left and right extreme sections of the screen main body 12. The support sections 13 are configured of a first support section 131 supporting the left extreme section of the screen main body 12, and a second support section 132 supporting the right extreme section.

In the embodiment, specifically, the first support section 131 is configured of a first support section main body 1311 which covers the left extreme section on the rear surface side of the screen main body 12 with an approximately plate-like member having a length the same as the vertical length of the screen main body 12. The first support section main body 1311 fixes and supports a rear surface side of the screen main body 12, which faces the first support section main body 1311, using an unshown double sided adhesive member or the like. The first support section main body 1311, in the embodiment, being formed of a synthetic resin member, regulates the flexibility in the left extreme section of the screen main body 12 by means of the rigidity of the synthetic resin member. It being sufficient that a member forming the first support section main body 1311 is a member which regulates the flexibility of the screen main body 12, the kind of member is no object.

The first support section main body 1311 has provided at either vertical extremity thereof two engagement hole sections 1312 and 1313 acting as second connection sections. The engagement hole section 1312 comes into engagement with a connection section 1512, acting as a first connection section, of a first arm member 151 of the arm members 15, to be described hereafter. Also, the engagement hole section 1313 comes into engagement with a connection section 1522, acting as the first connection section, of a second arm member 152 of the arm members 15, to be described hereafter.

The second support section 132, being configured in approximately the same way as the first support section 131, in the embodiment, is formed in a shape symmetrical to that of the first support section 131 with respect to a central line dividing the screen main body 12 into right and left. Specifically, the second support section 132 is configured of a second support section main body 1321 which covers the right extreme section on the rear surface side of the screen main body 12 with an approximately plate-like member having a length the same as the vertical length of the screen main body 12. The second support section main body 1321 fixes and supports a rear surface side of the screen main body 12, which faces the second support section main body 1321, using an unshown double sided adhesive member or the like. The second support section main body 1321, in the embodiment, being formed of a synthetic resin member, regulates the flexibility in the right extreme section of the screen main body 12 by means of the rigidity of the synthetic resin member. It being sufficient that a member forming the second support section main body 1321 is a member which regulates the flexibility of the screen main body 12, the kind of member is no object.

The second support section main body 1321 has provided at either vertical extremity thereof two engagement hole sections 1322 and 1323 acting as second connection sections. The engagement hole section 1322 comes into engagement with a connection section 1532, acting as the first connection section, of a third arm member 153 of the arm members 15, to be described hereafter. Also, the engagement hole section 1323 comes into engagement with a connection section 1542, acting as the first connection section, of a fourth arm member 154 of the arm members 15, to be described hereafter.

Figure 3:
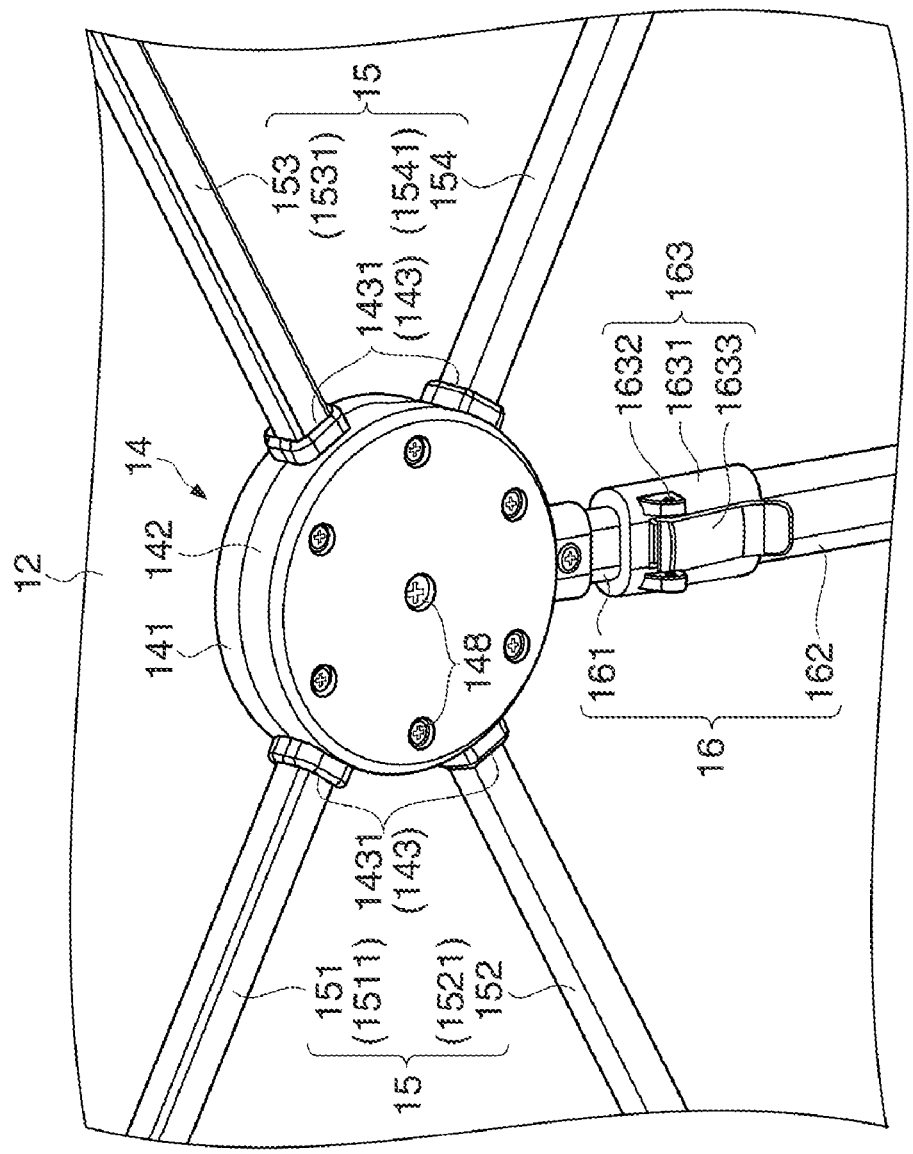
FIG. 3 is an enlarged view of a periphery of an arm fixing section.
Figure 4A:
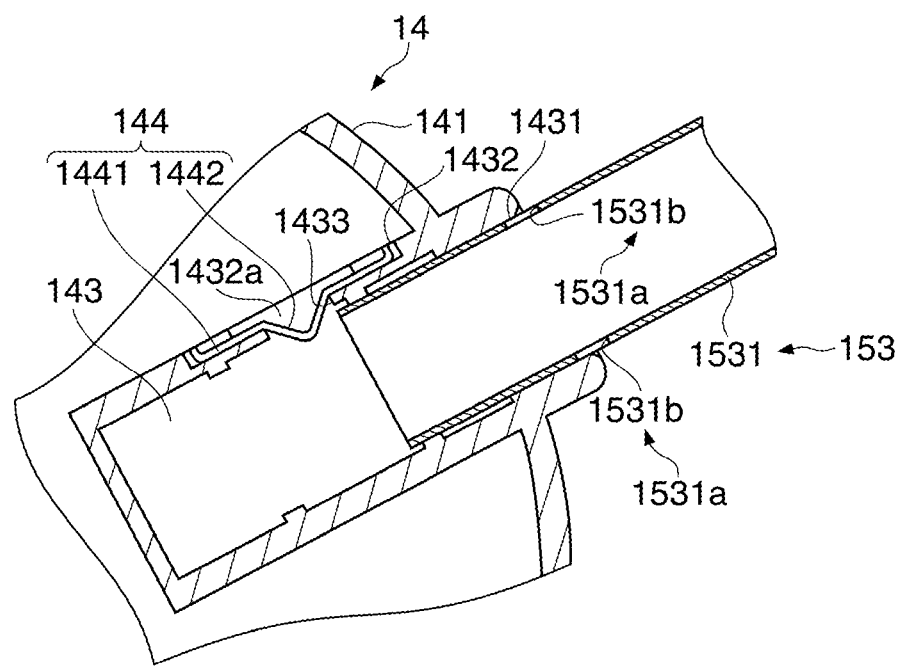
Figure 4B:
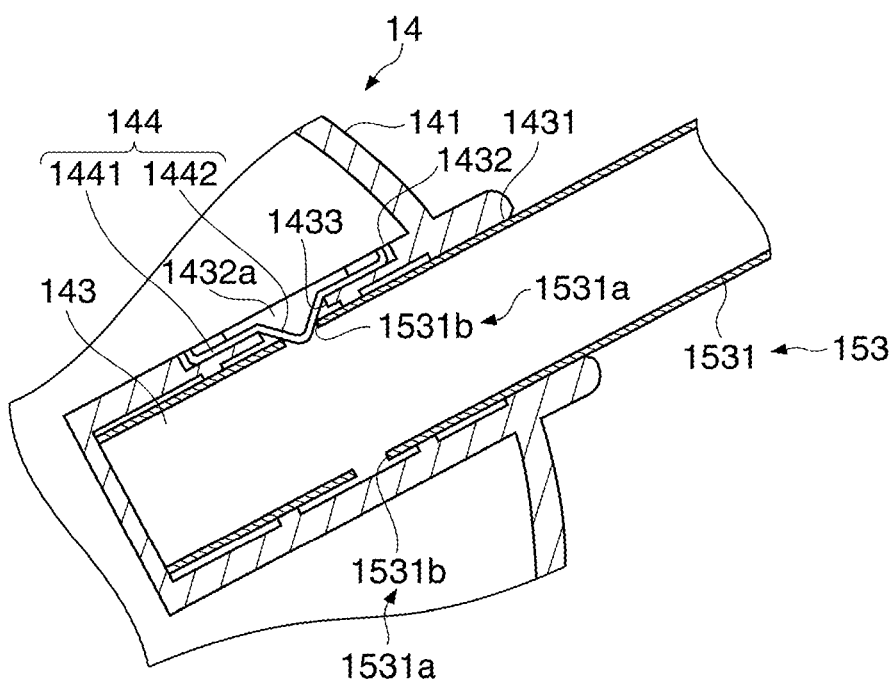

FIG. 3 is an enlarged view of a periphery of the arm fixing section. FIGS. 4A and 4B being schematic fragmentary sectional views of the arm fixing section, FIG. 4A is a sectional view showing a condition in which the third arm member is in the process of being attached to the arm fixing section, while FIG. 4B is a sectional view showing a condition in which the attachment of the third arm member to the arm fixing section is complete. FIGS. 4A and 4B show sectional views taken along the plane approximately parallel to the screen main body 12. Also, specifically, FIGS. 4A and 4B show an arm support section 143 and fourth connection section which detachably fix the third arm member 153. A description will be given, referring to FIGS. 2 to 4B, of a configuration of the arm fixing section 14, a configuration of the arm members 15, and an attachment of the arm members 15 to the arm fixing section 14.

The arm fixing section 14, being installed at the upper extremity of the support rod 16 (a first support rod 161), to be described hereafter, in the embodiment, detachably fixes four arm members 15, to be described hereafter. The arm fixing section 14, forming an approximately cylindrical shape, is configured having a first fixing frame 141 and second fixing frame 142, as shown in FIGS. 2 and 3. By clamping the support rod 16 between the first fixing frame 141 and second fixing frame 142, and screwing them using fixing screws 148, as well as the first fixing frame 141 and second fixing frame 142 being fixed, the arm fixing section 14 is integrally fixed to the first support rod 161 configuring the support rod 16.

Also, as shown in FIGS. 3, 4A, and 4B, the arm fixing section 14 is configured having the arm support sections 143 supporting the other extremities of the arm members 15, to be described hereafter, and fixing springs 144, acting as the fourth connection sections, which fix the other extremities of the arm members 15 to the arm support sections 143. The fixing springs 144 are also configured as second spring members. With the arm support section 143 and fixing spring 144 as one set, four sets with the same configuration are installed, correlated to the four arm members 15, at a predetermined angle in the arm fixing section 14.

Each of the arm support sections 143 has a support hole 1431, for inserting the other extremity of the arm member 15, formed in the side surface of the arm fixing section 14. The support hole 1431 is formed in such a way that the arm member 15 can be supported in a protruding form. A groove 1432 and opening 1433 are formed in the side surface of the arm support section 143. The groove 1432 is formed with a space 1432a left taking account of an amount of movement (an amount of deflection) due to the springiness of the fixing spring 144.

The fixing spring 144 is configured of a leaf spring, as shown in FIGS. 4A and 4B. The fixing spring 144 is formed of a fixing spring main body 1441 formed into a plate, and a convexity 1442 having a convex shape in an approximately central portion of the fixing spring main body 1441. Then, the fixing spring 144 is fixed with the fixing spring main body 1441 wedged into the groove 1432, in such a way as to attain a condition in which the convexity 1442 has thrust through the opening 1433 of the arm support section 143 into the inner side of the arm support section 143.

The arm members 15, forming a hollow columnar shape approximately rectangular in cross-section, are attached to the arm fixing section 14, stretching the screen section 11 (tautening the screen main body 12). As the arm members 15, in the embodiment, four arm members 15 are used. As shown in FIGS. 2 and 3, in the embodiment, the arm member 15 attached in the upper left direction of the arm fixing section 14 is taken as the first arm member 151. Also, the arm member 15 attached in the lower left direction of the arm fixing section 14 is taken as the second arm member 152. Also, the arm member 15 attached in the upper right direction of the arm fixing section 14 is taken as the third arm member 153. Then, the arm member 15 attached in the lower right direction of the arm fixing section 14 is taken as the fourth arm member 154.

All the four arm members 15 are configured in approximately the same way. However, the first connection section, to be described hereafter, included in one extremity of each arm member 15, which is the extremity connected to the second connection section included in either support section 13, is configured in two ways. In the embodiment, the first connection sections of the first arm member 151, second arm member 152, and fourth arm member 154 are configured in the same way, and the first connection section of only the third arm member 153 is configured slightly differently from three other arm members 15. All four third connection sections, to be described hereafter, detachably fixed to the arm fixing section 14, which are included in the other extremities of the arm members 15 are configured in the same way. Details will be described hereafter. Therein, regarding the four third connection sections, all configured in the same way, which are included in the other extremities of the arm members 15, a description will be given of a configuration and operation thereof, using the third arm member 153.

Specifically, as heretofore described, the third arm member 153 (the arm member 15) is roughly configured of a third arm member main body 1531 formed in a hollow columnar shape approximately rectangular in cross-section, the connection section 1532 acting as the first connection section brought into engagement with the engagement hole section 1322 as the second connection section of the second support section 132, and an engagement hole section 1531a acting as the third connection section fixed to the arm fixing section 14. The connection section 1532 will be described hereafter. Also, in the embodiment, an aluminum alloy member is used as the third arm main body 1531. The connection section 1532 is formed mainly of a synthetic resin member.

The engagement hole section 1531a of the third arm member 153 has a hole 1531b acting as a concavity. The hole 1531b of the engagement hole section 1531a is formed as two rectangular holes in the opposed side surfaces of the third arm main body 1531, as partially shown in FIGS. 4A and 4B. The two holes 1531b enable the third arm member 153 to be attached to and detached from not only the upper right portion of the arm fixing section 14, but all the four direction portions. The same applies to the first arm member 151, second arm member 152, and fourth arm member 154. Specifically, the two holes 1531b are formed in order to correspond to the positions to which are fixed the fixing springs 144 installed one in each of the four arm support sections 143, and as a result, the arm members 15 can be attached to any arm support section 143.

As shown in FIG. 4A, when fixing (attaching) the third arm member 153 to the arm fixing section 14, the other extremity of the third arm member 153 is inserted into the interior of the arm support section 143 from the support hole 1431. When the insertion is continued, the other extremity of the third arm member 153 abuts against the convexity 1442 of the fixing spring 144. When the insertion of the third arm member 153 is further continued, the convexity 1442 slides on the outer surface of the third arm member main body 1531 of the third arm member 153 due to the fixing spring main body 1441 bending into the space 1432a of the groove 1432. Then, as shown in FIG. 4B, the convexity 1442 comes into engagement with the concavity (the hole 1531b) of the third arm member 153. When this condition is attained, the third arm member 153 is fixed (attached) to the arm support section 143 (the arm fixing section 14).

When removing the third arm member 153 from the arm support section 143, in this fixed condition, the third arm member 153 is pulled in a direction along the third arm main body 1531. When the tensile force exceeds a predetermined value (a spring force of the fixing spring 144), by bringing the convexity 1442 and the concavity (the hole 1531b) of the engagement hole section 1531a of the third arm main body 1531 out of engagement with each other, it is possible to remove the third arm member 153 from the arm support section 143 (the arm fixing section 14).

With the third arm member 153 as an example, by inserting and fixing the remaining first arm member 151, second arm member 152, and fourth arm member 154 into the respective arm support sections 143 in the same way as heretofore described, it is possible to attach (mount) the four arm members 15 to (in) the arm fixing section 14 in predetermined directions. Also, it is possible to remove the fixed arm members 15 from the arm fixing section 14.

Figure 5:
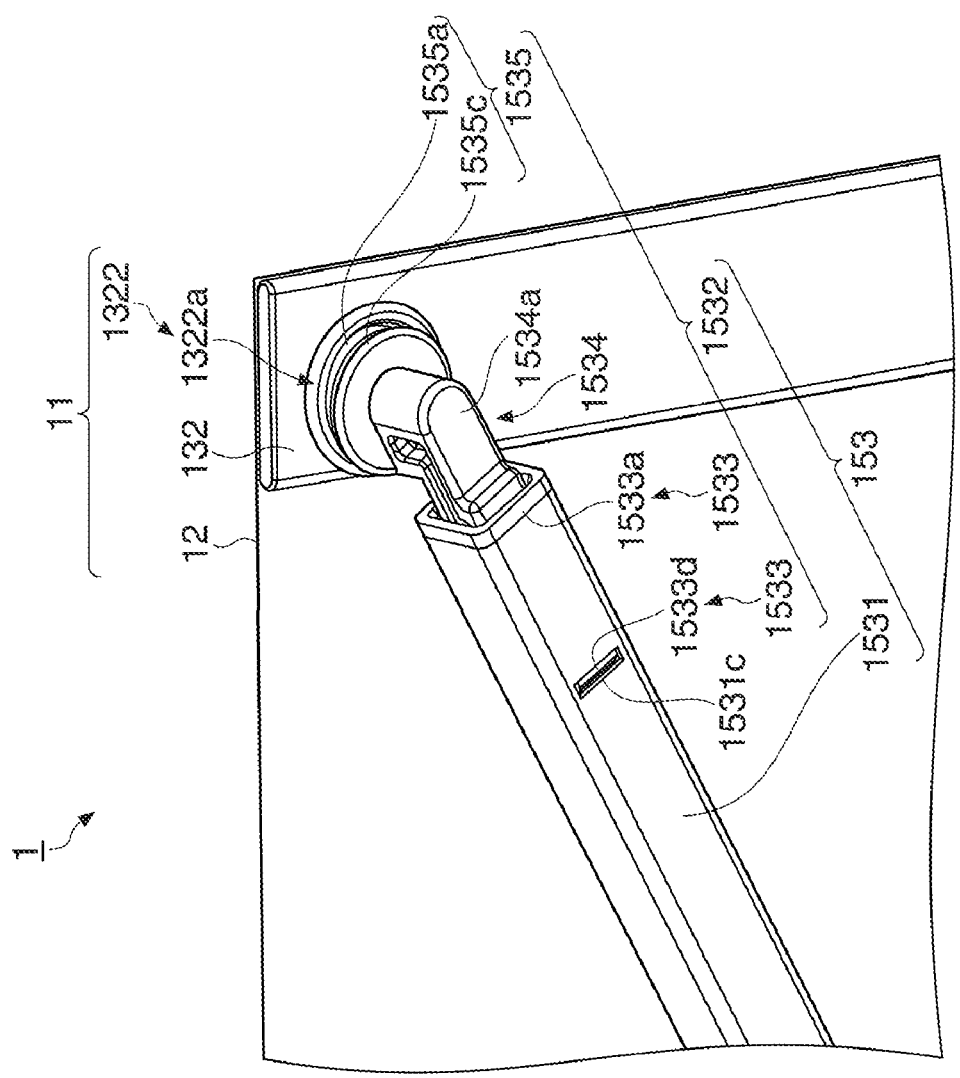
FIG. 5 is a perspective view showing a connection of the third arm member and a second support section.
Figure 6:
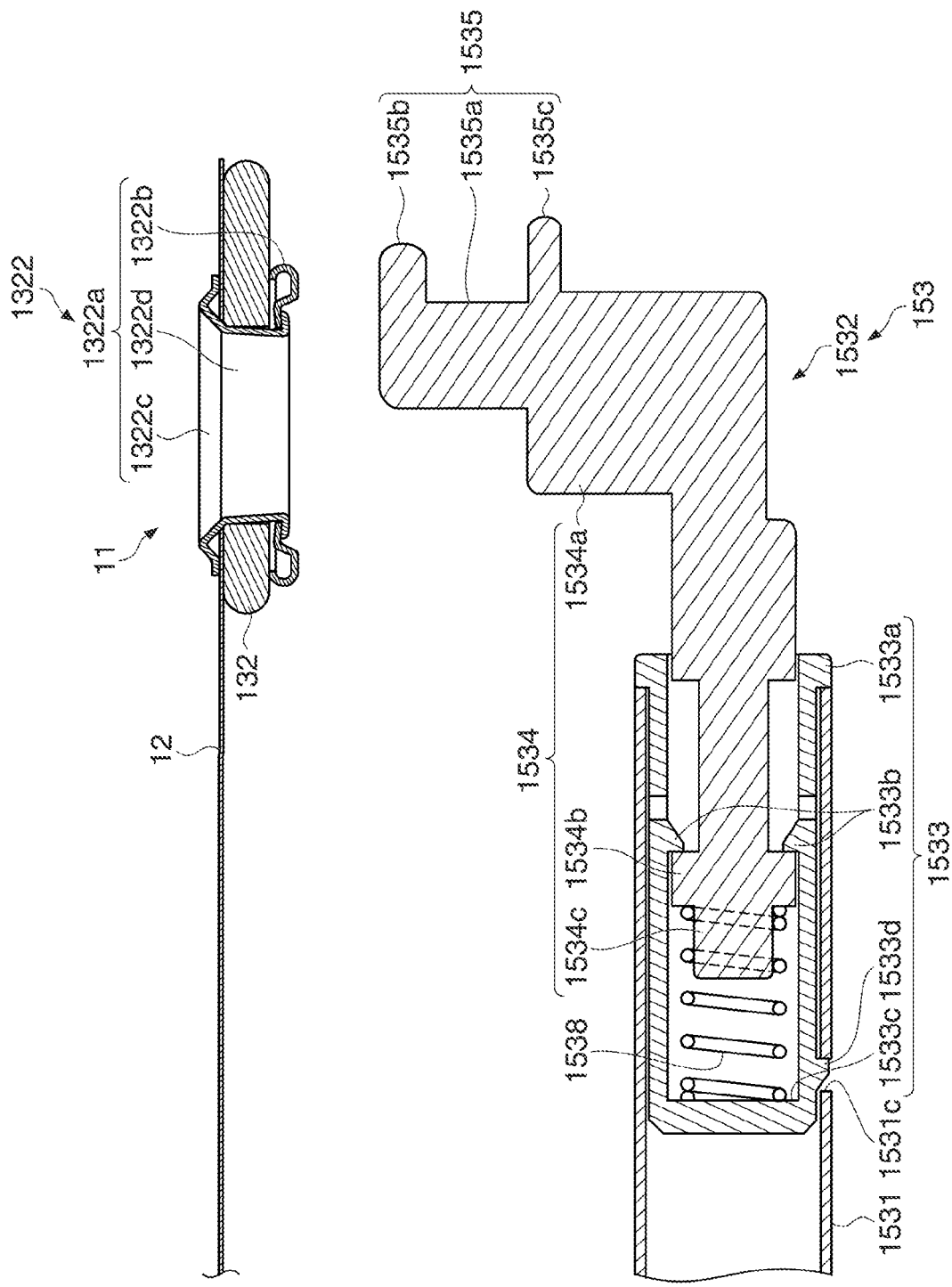
FIGS. 6A and 6B are schematic sectional views of a first connection section of the third arm member and a second connection section of the second support section, wherein 6A is a schematic sectional view of the second connection section included in the second support section, and 6B is a schematic sectional view of the first connection section included in the third arm member.
Figure 7:
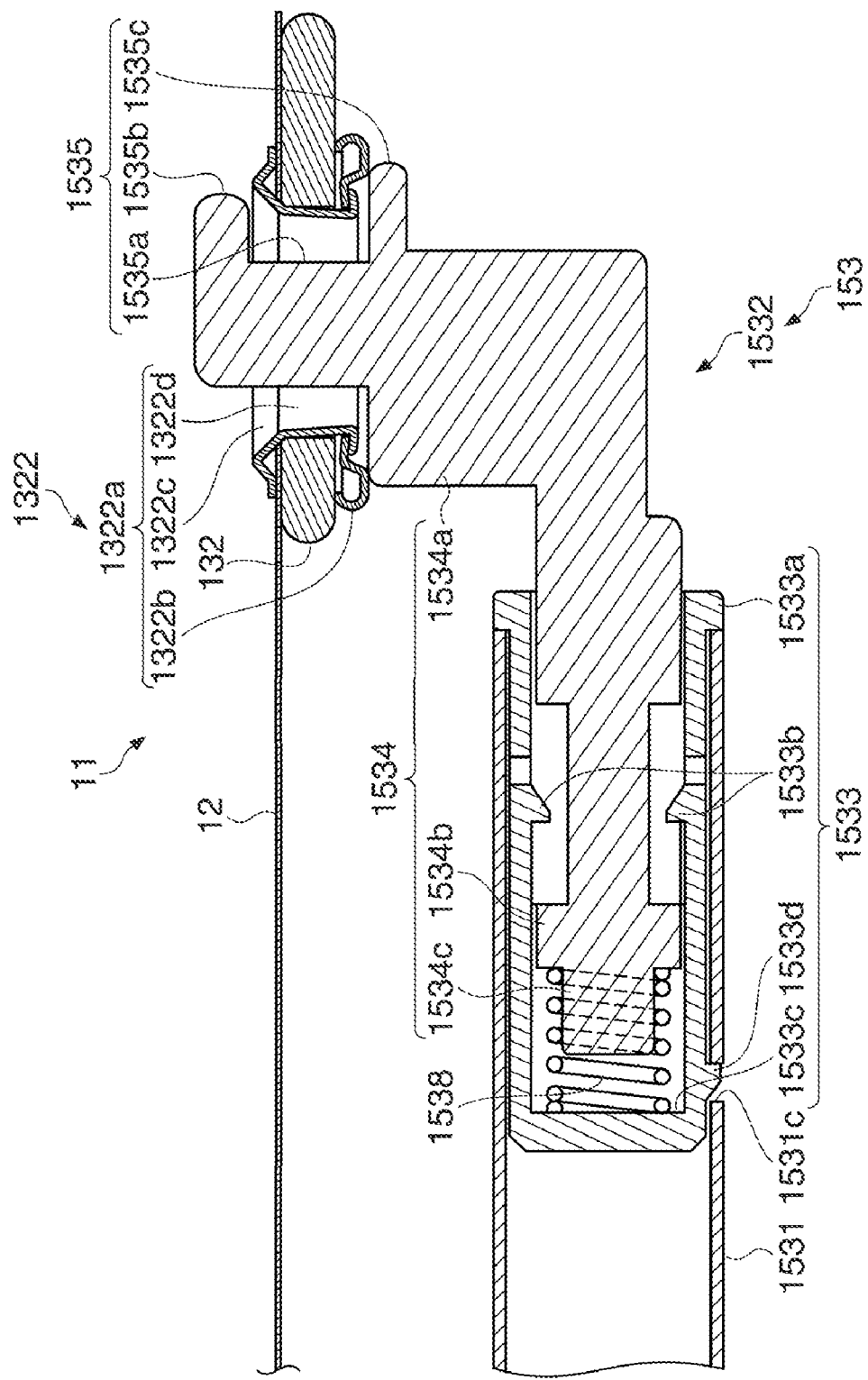
FIG. 7 is a schematic sectional view showing a condition in which the first connection section of the third arm member and the second connection section of the second support section are in engagement.
Figure 8:
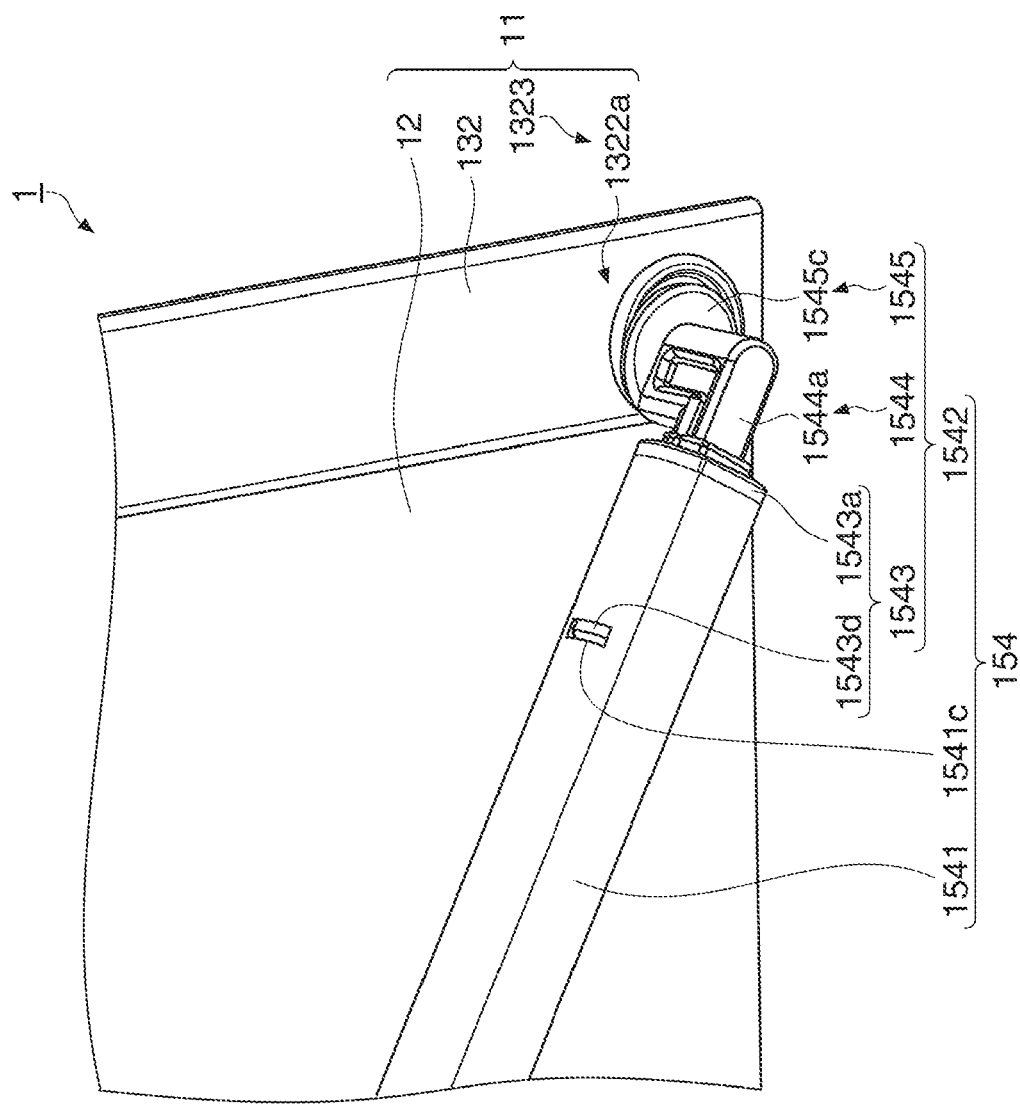
FIG. 8 is a perspective view showing a connection of a fourth arm member and the second support section.
Figure 9:
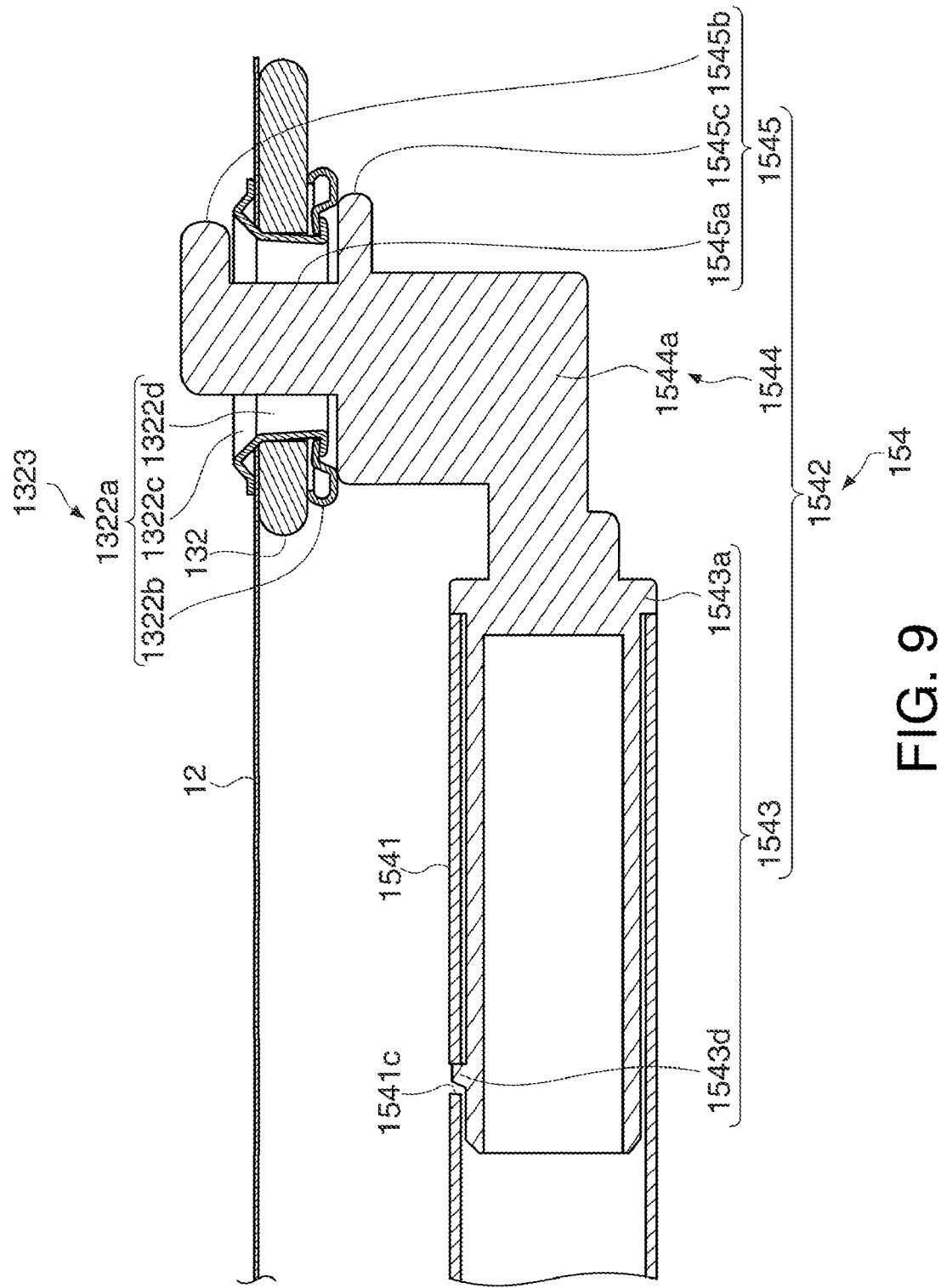
FIG. 9 is a schematic sectional view of a first connection section of the fourth arm member and the second connection section of the second support section.

FIG. 5 is a perspective view showing a connection of the third arm member and second support section. FIGS. 6A and 6B being schematic sectional views of the first connection section of the third arm member, and the second connection section of the second support section, FIG. 6A is a schematic sectional view of the second connection section included in the second support section, while FIG. 6B is a schematic sectional view of the first connection section included in the third arm member. FIG. 7 is a schematic sectional view showing a condition in which the first connection section of the third arm member and the second connection section of the second support section are in engagement. FIG. 8 is a perspective view showing a connection of the fourth arm member and second support section. FIG. 9 is a schematic sectional view of the first connection section of the fourth arm member and the second connection section of the second support section. The sectional views shown in FIGS. 6A, 6B, and 7 are views taken perpendicular to the surface of the screen main body 12 along the third arm member 153. The sectional view shown in FIG. 9 also being a view taken perpendicular to the surface of the screen main body 12 along the fourth arm member 154, one portion (an insertion section fixing projection 1543d portion, to be described hereafter) is a view taken parallel to the surface of the screen main body 12.

A description will be given, referring to FIGS. 5 to 9, of configurations of the first connection section (the connection section 1532) of the third arm member 153, the first connection section (the connection section 1542) of the fourth arm member 154, and the second connection sections (the engagement hole sections 1322 and 1323) of the second support section 132. Also, a description will be given of a connection of the first connection sections and second connection sections, specifically, of the connection section 1532 and engagement hole section 1322, and of the connection section 1542 and engagement hole section 1323.

As shown in FIG. 5, the third arm member 153 fixed to the arm fixing section 14 has the connection section 1532 as the first connection section at one extremity. Also, the engagement hole section 1322 acting as the second connection section is formed at an extremity of the second support section 132 configuring the screen section 11. The engagement hole section 1322 is also formed in the screen main body 12, passing therethrough. The third arm member 153 is attached to and detached from the screen main body 12 by attaching and detaching the connection section 1532 of the third arm member 153 to and from the engagement hole section 1322 of the second support section 132.

As shown in FIGS. 5, 6A, and 6B, the connection section 1532 acting as the first connection section installed in the third arm member 153 is roughly configured of an insertion section 1533, an extension section 1534, and an engagement section 1535. The insertion section 1533, having an outer shape following the inner peripheral surface of the third arm main body 1531 of the third arm member 153, is formed having a shape which is depressed inward from an extremity of the third arm main body 1531.

The insertion section 1533 has a protection section 1533a which prevents a wound being inflicted on a hand or the like of a user by the extremity surface of the third arm main body 1531. Also, the insertion section 1533 has a protrusion limitation projection 1533b which abuts against a protrusion limitation section 1534b of the extension section 1534, to be described hereafter. Also, the insertion section 1533 has a guide surface 1533c which guides a spring member 1538, to be described hereafter. Also, the insertion section 1533 has an insertion section fixing projection 1533*d* which comes into engagement with an insertion section fixing hole 1531*c* formed in the side surface of the third arm main body 1531, and fixes the insertion section 1533 inside the third arm main body 1531. The connection section 1532 is guided by the insertion section 1533, and fixed to the third arm main body 1531.

The extension section 1534, configuring the main body of the first connection section, includes a gripper 1534*a* which, extending from the extremity of the third arm main body 1531, is gripped by the user, the protrusion limitation section 1534*b* which abuts against the protrusion limitation projection 1533*b* of the insertion section 1533, and limits further protrusion, and a guide projection 1534*c* which guides the spring member 1538 for causing protrusion.

The spring member 1538 is configured as a first spring member. The spring member 1538, being configured of a helical compression spring, is installed by both extremities thereof being guided by the guide surface 1533*c* of the insertion section 1533 and the guide projection 1534*c* of the extension section 1534. The extension section 1534, and the engagement section 1535, to be described hereafter, are biased in a direction along the third arm main body 1531, from the extremity of the third arm main body 1531, by the spring member 1538.

The engagement section 1535 is configured at the leading extremity of the gripper 1534*a* included in the extension section 1534. The engagement section 1535 is configured of a disk shaped fixing plate 1535*c* connected to the gripper 1534*a*, a groove 1535*a*, and a hook 1535*b* positioned at the leading extremity.

With the connection section 1532 of the third arm member 153 configured in this way, in a normal condition, the extension section 1534 (the engagement section 1535) projects from the extremity of the third arm main body 1531 due to the spring force of the spring member 1538. Also, the extension section 1534 (the engagement section 1535), with the gripper 1534*a* being gripped, can also be returned to the third arm main body 1531 side against the spring force of the spring member 1538.

The engagement hole section 1322 acting as the second connection section is configured of an eyelet 1322*a* forming a rivet formed of a metallic component (aluminum, brass, or the like), as shown in FIGS. 6A and 6B. The eyelet 1322*a* is configured of a first tubular body 1322*b* having a hole, and a second tubular body 1322*c* having a hole slightly smaller than the hole of the first tubular body 1322*b*.

Herein, a brief description will be given of a method of forming the engagement hole section 1322. Firstly, a through hole is formed in an area of the second support section 132 and screen main body 12 in which the engagement hole section 1322 is installed. Next, the first tubular body 1322*b* is installed on the rear surface side of the second support section 132, correlated to the through hole, and the second tubular body 1322*c* is inserted into the through hole and the hole of the first tubular body 1322*b* from the front surface side of the screen main body 12. Subsequently, the outer peripheral extremity of the second tubular body 1322*c*, which is a side from which the second tubular body 1322*c* has been inserted, is transformed (swaged) using a jig in such a way as to be folded toward the first tubular body 1322*b*, thereby forming the engagement hole section 1322.

The second support section 132 and screen main body 12 are clamped by the eyelet 1322*a*. Also, the engagement hole section 1322 acting as the second connection section is formed having a hole 1322*d* by the eyelet 1322*a*.

As shown in FIG. 8, the fourth arm member 154 fixed to the arm fixing section 14 has the connection section 1542 as the first connection section at one extremity. Also, the engagement hole section 1323 acting as the second connection section is formed at an extremity of the second support section 132 configuring the screen section 11. Also, the fourth arm member 154 is attached to and detached from the screen main body 12 by attaching and detaching the connection section 1542 (specifically, an engagement section 1545) of the fourth arm member 154 to and from the engagement hole section 1323 of the second support section 132.

The connection section 1542 included in the fourth arm member 154 being configured in approximately the same way as the heretofore described connection section 1532 included in the third arm member 153, a difference is that the spring member 1538 is not used. As shown in FIG. 9, the connection section 1542 acting as the first connection section installed in the fourth arm member 154 is roughly configured of an insertion section 1543, an extension section 1544, and an engagement section 1545. Also, the insertion section 1543, extension section 1544, and engagement section 1545 are integrally formed.

A difference from the connection section 1532 of the third arm member 153, the extension section 1534 (the engagement section 1535) of which is movable by the spring member 1538, is that the connection section 1542 of the fourth arm member 154 is not movable, but fixed to an extremity of the fourth arm member 154. In external appearance, the connection section 1532 of the third arm member 153 and the connection section 1542 of the fourth arm member 154 have approximately the same form.

Specifically, as shown in FIG. 9, the insertion section 1543 of the connection section 1542 of the fourth arm member 154, having an outer shape following the inner peripheral surface of the fourth arm main body 1541 of the fourth arm member 154, is inserted into the interior, from the extremity, of the fourth arm main body 1541. The insertion section 1543 has a protection section 1543*a* which prevents a wound being inflicted on a hand or the like of a user by the extremity surface of the fourth arm main body 1541. Also, the insertion section 1543 has an insertion section fixing projection 1543*d* which comes into engagement with an insertion section fixing hole 1541*c* formed in the side surface of the fourth arm main body 1541, and fixes the insertion section 1543 inside the fourth arm member 1541. The connection section 1542 is guided by the insertion section 1543, and fixed to the fourth arm main body 1541.

The extension section 1544, being connected to the insertion section 1543 and extended from the extremity of the fourth arm main body 1541, has a gripper 1544*a* (the same as the gripper 1534*a*) which is gripped by the user. Also, the engagement section 1545 is configured at a leading extremity of the gripper 1544*a* included in the extension section 1544. The engagement section 1545 is configured of a disk shaped fixing plate 1545*c* connected to the gripper 1544*a*, a groove 1545*a*, and a hook 1545*b* positioned at the leading extremity. The engagement section 1545 is configured in the same way as the heretofore described engagement section 1535 of the third arm member 153.

As heretofore described, the connection section 1542 of the fourth arm member 154 is fixed extending a predetermined distance from the extremity of the fourth arm main body 1541. In the embodiment, the first arm member 151 and second arm member 152, which are the other arm members 15, have the same configuration and structure as the fourth arm member 154. For this reason, as shown in FIG. 2, the connection section 1512 acting as the first connection section of the first arm member 151, and the connection section 1522 acting as the first connection section of the second arm member 152, are configured in the same way as the connection section 1542 of the fourth arm member 154. Consequently, a description of the connection sections 1512 and 1522 will be omitted.

The engagement hole section 1323 formed in the second support section 132 connected to the connection section 1542 of the fourth arm member 154 is configured in the same way as the heretofore described engagement hole section 1322. In FIG. 9, the same reference numerals and characters as those of the engagement hole section 1322 are appended to the engagement hole section 1323. The engagement hole sections 1312 and 1313 formed in the first support section 131 are also configured in the same way as the heretofore described engagement hole section 1322. Consequently, a description of the engagement hole sections 1323, 1312, and 1313 will be omitted.

Next, a description will be given, referring to FIG. 9, of an operation of bringing the connection section 1542 (the engagement section 1545) of the fourth arm member 154 into engagement with the engagement hole section 1323 of the screen main body 12 (the screen section 11).

The user grips the second support section 132 of the screen section 11 with one hand, and grips the gripper 1544*a* of the connection section 1542 (the extension section 1544) with the other hand. Then, the user inserts the hook 1545*b* of the connection section 1542 (the engagement section 1545) into the hole 1322*d* of the engagement hole section 1323 from the rear surface side, brings it out to the front surface side of the screen main body 12, and hooks it over the second tubular body 1322*c* of the eyelet 1322*a*. Then, the user makes an adjustment with a hand in such a way that the groove 1545*a* of the connection section 1542 (the engagement section 1545) abuts against the inner surface of the hole 1322*d* of the engagement hole section 1323.

By the adjustment, the hook 1545*b* of the connection section 1542 (the engagement section 1545) is brought into abutment with the outer surface of the second tubular body 1322*c*, the groove 1545*a* of the connection section 1542 (the engagement section 1545) is brought into abutment with the inner surface of the hole 1322*d* of the engagement hole section 1323, and the fixing plate 1545*c* of the connection section 1542 (the engagement section 1545) is brought into abutment with the outer surface of the first tubular body 1322*b*. By this means, by the hook 1545*b* and fixing plate 1545*c* of the connection section 1542 (the engagement section 1545) taking on a form in which they clamp the eyelet 1322*a*, it is possible to bring the engagement hole section 1323 into engagement with the connection section 1542 (the engagement section 1545).

Next, a description will be given, referring to FIGS. 2 to 9, of an operation of mounting the screen main body 12 (the screen section 11) on the arm members 15. Also, in the subsequent description, a description will also be given including a mounting of the connection section 1532 of the third arm member 153 in the engagement hole section 1322.

Firstly, the user fixes the arm members 15 to the arm fixing section 14. The four arm members 15 are fixed by the other extremities thereof being inserted one into each of the arm support sections 143 from the corresponding support holes 1431 in the way previously described. In the embodiment, as shown in FIG. 2, the first arm member 151 is fixed in the upper left direction of the arm fixing section 14, the second arm member 152 is fixed in the lower left direction of the arm fixing section 14, the third arm member 153 is fixed in the upper right direction of the arm fixing section 14, and the fourth arm member 154 is fixed in the lower right direction of the arm fixing section 14. By this means, the arm members 15 take on a condition in which they are radially mounted in four directions, centered around the arm fixing section 14.

In the embodiment, as heretofore described, only the third arm member 153 differing from the three other arm members 15, the first arm member 151, second arm member 152, and fourth arm member 154 are of the same configuration (the same kind). In the embodiment, for the sake of description, reference numerals are appended to the individual arm members 15.

After the four arm members 15 are fixed to the arm fixing section 14, the user brings the engagement hole section 1312 of the screen section 11 into engagement with the connection section 1512 of the first arm member 151. In order to do so, the user, while gripping the rolled screen section 11 with one hand, and gripping the first support section 131 with the other hand, mounts the engagement hole section 1312 configured in the first support section 131 on the connection section 1512 of the first arm member 151. The connection section 1512 of the first arm member 151 being configured in the same way as the connection section 1542 of the fourth arm member 154, an unshown engagement section of the connection section 1512 is brought into engagement with the engagement hole section 1312 by the same kind of operation as with the engagement section 1545 of the connection section 1542 of the fourth arm member 154.

Next, the user brings the engagement hole section 1313 of the screen section 11 into engagement with the connection section 1522 of the second arm member 152. In order to do so, in a condition in which the engagement hole section 1312 of the screen section 11 is in engagement with the connection section 1512 of the first arm member 151, the user mounts the engagement hole section 1313 configured in the first support section 131 on the connection section 1522 of the second arm member 152. The connection section 1522 of the second arm member 152 also being configured in the same way as the connection section 1542 of the fourth arm member 154, an unshown engagement section of the connection section 1522 is brought into engagement with the engagement hole section 1313 by the same kind of operation as with the engagement section 1545 of the connection section 1542 of the fourth arm member 154.

Next, the user brings the engagement hole section 1322 of the screen section 11 into engagement with the connection section 1532 of the third arm member 153. Herein, a description will be given, referring to FIGS. 6A, 6B, and 7, of a method of causing the engagement. The user grips the second support section 132 of the screen section 11 with one hand, and grips the gripper 1534*a* of the connection section 1532 (the extension section 1534) of the third arm member 153 with the other hand.

The extension section 1534 (the engagement section 1535) of the connection section 1532 of the third arm member 153, in the normal condition, protrudes from the extremity of the third arm main body 1531 due to the spring force of the spring member 1538, as shown in FIGS. 6A and 6B. The views shown in FIGS. 6A and 6B also show a displacement in position between the connection section 1532 and the engagement hole section 1322 (an amount of protrusion of the extension section 1534). For this reason, the user, while gripping the gripper 1534*a* of the connection section 1532 (the extension section 1534) with one hand, returns the connection section 1532 (the extension section 1534) to the third arm main body 1531 side.

Then, the user pulls the screen section 11 brought into engagement with the connection section 1512 of the first arm member 151 and the connection section 1522 of the second arm member 152 by the previously described operation, in the direction of the connection section 1532 of the third arm member 153, with the other hand. In this condition, the user inserts the hook 1535*b* of the engagement section 1535 returned to the third arm main body 1531 side into the hole 1322*d* of the engagement hole section 1322 from the rear surface side, brings it out to the front surface side, and hooks it over the second tubular body 1322*c* of the eyelet 1322*a*. At this time, the user makes an adjustment in such a way that the groove 1535*a* of the engagement section 1535 abuts against the inner surface of the hole 1322*d* of the engagement hole section 1322.

Subsequently, on the user releasing his or her grip, as shown in FIG. 7, the hook 1535*b* abuts against the outer surface of the second tubular body 1322*c*, the groove 1535*a* of the engagement section 1535 abuts against the inner surface of the hole 1322*d* of the engagement hole section 1322, and the fixing plate 1535*c* abuts against the outer surface of the first tubular body 1322*b*. By this means, by the hook 1535*b* and fixing plate 1535*c* of the engagement section 1535 taking on a condition in which they clamp the eyelet 1322*a*, it is possible to bring the engagement hole section 1322 into engagement with the engagement section 1535.

After bringing the engagement hole section 1322 of the screen section 11 into engagement with the connection section 1532 of the third arm member 153, the user brings the engagement hole section 1323 of the screen section 11 into engagement with the connection section 1542 of the fourth arm member 154. When bringing the engagement hole section 1323 of the screen section 11 into engagement with the connection section 1542 of the fourth arm member 154, it is necessary for the user to pull the screen main body 12 in the direction of the connection section 1542 with a hand gripping the second support section 132. As the subsequent operation has heretofore been described, a description will be omitted.

By the heretofore described operation, the mounting (attachment) of the screen main body 12 (the screen section 11) on (to) the arm members 15 is completed. Then, the attached screen main body 12 takes on a condition in which four approximate corners of the screen main body 12 are tautened in directions along the arm main bodies 1511, 1521, 1531, and 1541 of the individual arm members 15 (a stretched condition).

A force which constantly protrudes (pushes) the connection section 1532 of the third arm member 153 in the direction of the extremity of the third arm main body 1531 is applied to the connection section 1532 by the spring member 1538. For this reason, tension higher than tension applied in the directions along the first arm main body 1511 and fourth arm main body 1541 is applied to the screen main body 12 in the directions along the third arm main body 1531 and second arm main body 1521.

As both left and right extreme sections of the screen main body 12 are supported by the support sections 13, this difference in tension improves tension which is applied to the whole of the screen main body 12, approximately equalized all over the screen main body 12. Also, the spring force of the spring member 1538 is set in such a way that it can be driven back with the user's power, and that tension higher than tension applied in the event of using the same arm member as the other arm members 15, rather than using the spring member 1538, is applied to the third arm member 153.

When removing (separating) the screen main body 12 (the screen section 11) from the arm members 15, the user can carry out the removal by removing the engagement hole sections 1312, 1313, 1322, and 1323 respectively from the connection sections 1512, 1522, 1532, and 1542 according to a procedure the reverse of the mounting. Also, after removing the screen main body 12 (the screen section 11) from the arm members 15, by pulling the individual arm members 15 from the arm fixing section 14 in directions along the arm main bodies 1511, 1521, 1531, and 1541 respectively, it is possible to remove the arm members 15 from the arm fixing section 14.

Also, the removed screen section 11 can be stored in such a way that the screen main body 12 is rolled up with the first support section 131 or second support section 132 as a core. By rolling it up in this way, it is possible to make it difficult for wrinkles, creases, or the like to form on the surface of the screen main body 12.

Herein, returning to FIG. 3, a description will be given of a configuration and operation of the support rod fixing section 163.

The support rod fixing section 163 is installed at the upper extremity of a second support rod 162, as shown in FIG. 3. The support rod fixing section 163 is configured of a support rod fixing section main body 1631 and a lever 1633 fixed pivotally supported on the support rod fixing section main body 1631 by a pivot shaft 1632. Then, when the lever 1633 is rotated upward, an abutment section (not shown) formed on the inner surface side of the support rod fixing section main body 1631 comes out of abutment with the side surface of the first support rod 161. By this means, the first support rod 161 is movable back and forth with respect to the second support rod 162. Also, when the lever is rotated downward, the abutment section (not shown) comes into abutment with the side surface of the first support rod 161. By this means, the first support rod 161 is fixed to the second support rod 162 due to the force of friction with the abutment section (not shown).

Figure 10:
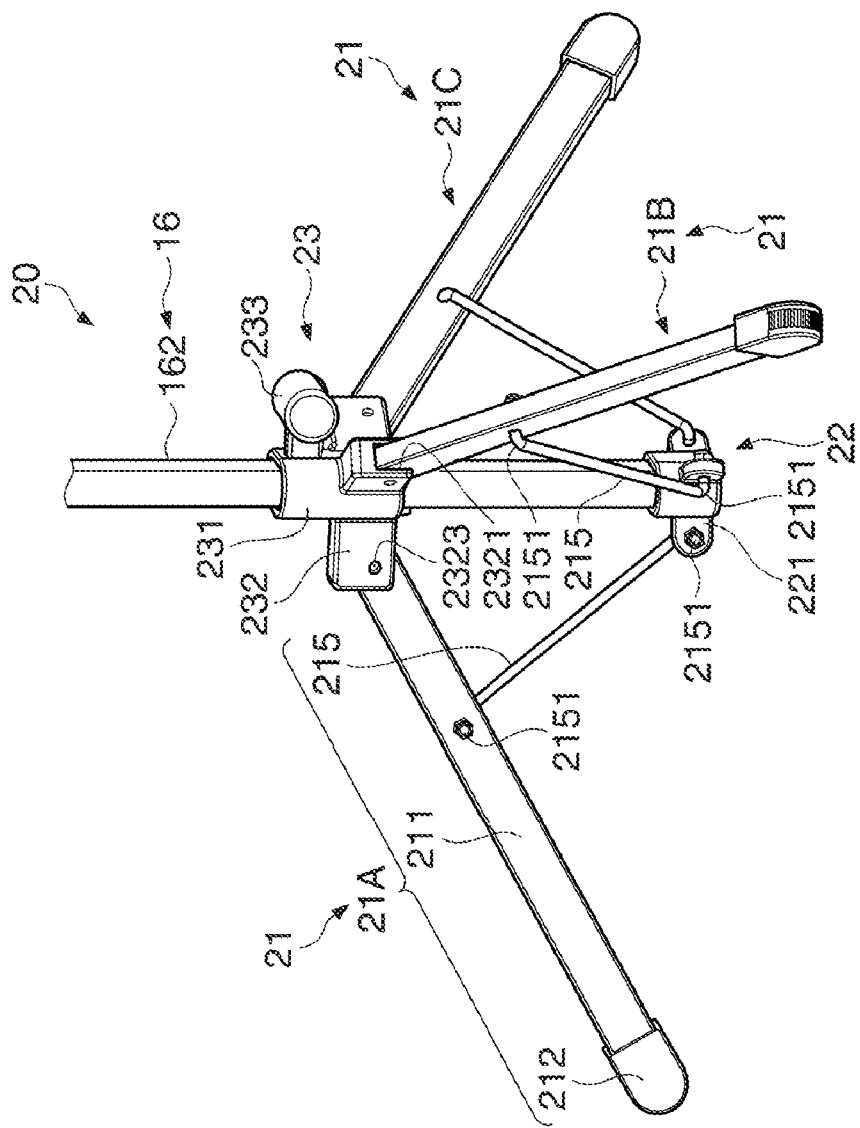
FIG. 10 is a perspective view showing an outline configuration of a legged support.

FIG. 10 is a perspective view showing an outline configuration of the legged support. FIG. 10 being a perspective view of the legged support 20 seen from the first support section 131 side of the screen 1, the left side of the drawing is the front surface side of the screen 1. Also, FIG. 10 shows a condition in which legs 21 of the legged support 20 are spread out to the maximum extent in relation to the support rod 16. A brief description will be given, referring to FIGS. 2, 3, and 10, of a configuration and operation of the legged support 20.

The legged support 20, being a portion supporting the image projection section 10, is configured, in the embodiment, including the support rod 16 (the second support rod 162), three legs 21, a leg fixing section 22, and a leg sliding section 23.

The second support rod 162, extending in the vertical direction, is formed of a hollow columnar member whose horizontal section is of an approximate running track shape. The second support rod 162, together with the first support rod 161 (see FIGS. 2 and 3), configures the support rod 16. Then, by inserting the first support rod 161 from the upper extremity of the second support rod 162 and, after adjusting a length of extension of the first support rod 161, fixing the first support rod 161 to the second support rod 162 using the support rod fixing section 163 (see FIGS. 2 and 3) installed at the upper extremity of the second support rod 162, it is possible to support and fix the image projection section 10. That is, by adjusting the length of extension of the first support rod 161 from the second support rod 162, it is possible to adjust the height of the screen main body 12 from an installation surface (for example, a floor surface), and it is possible to fix it using the support rod fixing section 163.

The legs 21 spread out in three directions. The individual legs 21, in a condition in which they spread out to the maximum extent from the support rod 16 (the second support rod 162) (this condition is referred to as an open condition), as well as causing the second support rod 162 to stand, support the image projection section 10 upright. The open condition is a condition which the legs 21 take on in a condition in which the screen 1 is used.

Also, the individual legs 21 can be put into a condition in which they are folded back to the support rod 16 (the second support rod 162) (this condition is referred to as a closed condition (not shown)). The closed condition, being a condition which the legs 21 take on at the time of storage, is a condition of the legs 21 which is suitable when the screen 1 is not used (stored or transported).

In the embodiment, among the three legs 21 of the legged support 20, one leg 21 is spread out in a direction approximately perpendicular to the screen main body 12 on the front surface side of the screen 1. This leg 21 is taken as a leg 21A. Then, the two other legs 21 of the legged support 20, by being spread out in a direction in which each of them is rotated approximately 120 degrees relative to the leg 21A around the support rod 16, spread out on the rear surface side of the screen 1. These two legs 21 are taken as legs 21B and 21C.

The leg fixing section 22 is a member which pivotally supports the three legs 21, and fixes them to the second support rod 162. Also, the leg sliding section 23 is a member which, being slidably supported along the second support rod 162, pivotally supports the three legs 21. By the leg sliding section 23 sliding along the second support rod 162 in such a way as to move closer to and away from the leg fixing section 22, the three legs 21 move in conjunction, moving the legs 21 close to each other (folding back the legs 21) and away from one another (spreading out the legs 21).

Each of the three legs 21 (21A, 21B, and 21C) has a leg main body 211, an abutment section 212, and a leg regulation member 215. As the three legs 21 have the same member, and are configured in the same way, a description will hereafter be given centered on one leg 21 (the leg 21A).

The leg main body 211 is formed of a hollow columnar rod-like member. The abutment section 212, being installed at one extremity of the leg main body 211, is formed of a synthetic resin member or the like which, having a high frictional resistance, does not damage an installation surface, and abuts against an installation surface such as a floor surface.

The leg regulation member 215, being formed of a round-bar metallic member, is configured having connection sections 2151 obtained by bending both extremities at an approximate right angle in the same direction, as shown in FIG. 10. Then, the connection section 2151 which is one extremity of the leg regulation member 215 is inserted through a coupling hole formed at an approximate center of the leg main body 211, and the leg main body 211 is pivotally supported with the inserted connection section 2151 as a pivot shaft, and coupled to the leg regulation member 215. The leg fixing section 22 being fixed to the lower extremity of the second support rod 162, and having projections 221 formed protruding, the connection section 2151 which is the other extremity of the leg regulation member 215 is inserted through a coupling hole formed in the projection 221, and the leg regulation member 215 is pivotally supported with the connection section 2151 as a pivot shaft.

The leg sliding section 23, being extended in a cylindrical shape, has a leg sliding section main body 231 which is formed in such a way as to allow the second support rod 162 to pass therethrough, and to be slidable along the second support rod 162. Also, the leg sliding section 23 is configured having leg sliding and pivoting sections 232, which are formed protruding in the same directions as three directions of the projections 221 formed on the leg fixing section 22, on the outer side surface of the leg sliding section main body 231.

Also, the leg sliding section 23 has a gripper 233, which is extended in a horizontal direction (the lateral direction of the screen 1) approximately perpendicular to the direction of extension of the second support rod 162 and formed in a cylindrical shape, in an upper area of the outer side surface of the leg sliding section main body 231, opposite to the screen main body 12 side.

A guide groove 2321 having a concave shape, in which a side surface on the leading extremity side of each leg sliding and pivoting section 232 is notched, and depressed downward from above, is formed in the leg sliding and pivoting section 232. Then, in a condition in which the other extremity of the leg main body 211 is guided into the guide groove 2321, the leg main body 211 is pivotally supported on, and coupled to, the leg sliding and pivoting section 232 by a common pivot shaft 2323.

When spreading out the legs 21 of the legged support 20, firstly, the user puts the legged support 20 into the closed condition in which the legs 21 of the legged support 20 are closed into a condition in which they are in abutment with an installation surface. In this condition, the user grips the gripper 233 of the leg sliding section 23 while supporting the second support rod 162, and depresses the gripper 233 by applying a force in a downward direction (the direction of the installation surface). In conjunction with this operation, the leg sliding section 23 starts sliding in the downward direction. In conjunction with this operation, the leg main body 211 pivotally supported on the leg sliding and pivoting section 232, as well as sliding in the downward direction, pivots around the pivot shaft 2323. The leg main body 211 pivots while being regulated by the leg regulation member 215.

When the leg sliding section 23 is caused to slide in the downward direction, the three legs 21 (21A, 21B, and 21C) coupled to the leg sliding section 23 carry out the heretofore described operation at approximately the same time, and operate in the directions in which the legs 21 spread out. As a result, as shown in FIG. 10, the leg 21A spreads out in the direction approximately perpendicular to the screen main body 12 on the front surface side of the screen 1. Also, the other legs 21B and 21C also spread out in the corresponding directions.

By means of the above operation, it is possible to spread out the legs 21 of the legged support 20.

In order to switch the legs 21 shown in FIG. 10 from the open condition to the closed condition, it is possible to carry out the switching by carrying out an operation the reverse of the heretofore described operation. Specifically, by the user gripping the gripper 233 of the leg sliding section 23, and applying a force in an upward direction, the leg sliding section 23 is caused to slide in the upward direction along the second support rod 162, and an operation the reverse of the heretofore described operation is thereby carried out, enabling the legs 21 to attain the closed condition.

The screen 1 is broken down into three portions: the screen section 11 (the screen main body 12 and the support sections 13), the arm members 15, and the legged support 20 (including the arm fixing section 14 fixed to the first support rod 161). Then, when storing the screen 1, as heretofore described, as for the screen section 11, the screen main body 12 is rolled up with the support sections 13 as a core. As for the arm members 15, the four arm members 15 are packed into a bundle. As for the legged support 20, the legs 21 are put into the closed condition. In this condition, a storage is carried out by storing the screen 1 in a bag or the like for storage.

According to the heretofore described embodiment, it is possible to obtain the following advantages.

The screen 1 of the embodiment includes the screen main body 12, having flexibility, onto which an image light is projected, the arm members 15 which tauten the screen main body 12, and the support sections 13 which regulate and support both opposed extreme sections of the screen main body 12. According to this kind of configuration, when the screen main body 12 is stretched by using the arm members 15 to tauten the screen main body 12, the support sections 13, by regulating the flexibility, support both opposed extreme sections of the screen main body 12. By means of these kinds of support section 13, it being possible to reduce an occurrence of wrinkles due to a crease of the screen main body 12, it is possible to improve flatness. Particularly, to date, as the screen main body 12 has been likely to have a crease or curl at its extremities, the flatness at the extremities of the screen main body 12 has particularly been lowered. In response to this, by the support sections 13 supporting both opposed extreme sections of the screen main body 12, it is possible to improve the flatness at the extremities. Also, by the support section 13 supporting both opposed extreme sections of the screen main body 12, it being possible to uniformly tauten the whole of the surface of the screen main body 12, it is possible to improve the flatness in comparison with a heretofore known case.

In the screen 1 of the embodiment, when storing or transporting the screen section 11 (the screen main body 12), by rolling up the screen main body 12 with the support sections 13 (the first support section 131 and second support section 132) as a base (core), it is possible to roll it up easily, compactly, and uniformly. By this means, it is possible, when carrying out the storage and transportation, to greatly reduce a formation of wrinkles or creases on the surface of the screen main body 12 in comparison with the heretofore known case. Also, as the support sections 13 having rigidity are made a core, it being possible to reduce a storage of the screen main body 12 in a folded condition, a bent condition, or the like after it is rolled up, it is possible to further reduce a formation of wrinkles, creases, or the like on the surface of the screen main body 12.

In the screen 1 of the embodiment, each first connection section (connection section 1512, 1522, 1532, and 1542) being provided at one extremity (the support section side extremity) of each arm member 15, and the second connection sections (the engagement hole sections 1312, 1313, 1322, and 1323) being provided in the support sections 13 (the first support section 131 and second support section 132), an attachment and detachment of the arm members 15 to and from the screen main body 12 is carried out by an attachment and detachment of the first connection sections to and from the second connection sections. According to this kind of configuration, by means of a simple operation such as the attachment and detachment of the first connection section provided at one extremity of each arm member 15 to and from each of the second connection sections provided in the support sections 13, it is possible to carry out the attachment and detachment of the arm members 15 to and from the screen main body 12 and, in the embodiment, by connecting the first connection sections and second connection sections in engagement with each other, it is possible to tauten and stretch the screen main body 12 while reducing an occurrence of wrinkles. Also, by bringing them out of engagement with each other, it is possible to remove (separate) the screen main body 12 from the arm members 15. In particular, as the second connection sections are provided in the support sections 13, it is possible to reduce an occurrence of wrinkles in portions of the screen main body 12 around the second connection sections.

In the screen 1 of the embodiment, by the first connection section (the connection section 1532) having the spring member 1538 which enables the first connection section main body (the extension section 1534 of the connection section 1532) to protrude by biasing the extension section 1534 in the direction along the arm member 15 (the third arm member 153) from the one extremity of the arm member 15 (the third arm member 153), it is possible for the connection section 1532 to further tauten the screen main body 12. By this means, it being possible to further reduce an occurrence of wrinkles due to a crease or curl of the screen main body 12, it is possible to further improve the flatness.

In the screen 1 of the embodiment, the arm fixing section 14 which detachably fixes the other extremities (the support rod side extremities) of the arm members 15 is installed on the support rod 16 (the first support rod 161). Also, the arm fixing section 14 fixes the third connection sections (the engagement hole sections 1531a) included at the other extremities of the arm members 15 by means of the fourth connection sections (the fixing springs 144) included in the arm fixing section 14. By this means, it is possible to securely fix the other extremities of the arm members 15 by securely supporting them on the arm support sections 143. Also, it is also possible to remove (separate) the arm members 15 from the arm fixing section 14.

In the screen 1 of the embodiment, a configuration is such that the third connection section (the engagement hole section 1531a) has the hole 1531b acting as the concavity, and the fourth connection section has the fixing spring 144 as the second spring member in which is formed the convexity 1442 coming into engagement with the concavity (the hole 1531b). According to this kind of configuration, by utilizing the springiness of the fourth connection section (the fixing spring 144) to bring the convexity 1442 formed on the fixing spring 144 into engagement with the concavity (the hole 1531b) included in the third connection section (the engagement hole section 1531a), it is possible to securely fix the arm member 15 to the arm support section 143 with a simple configuration. Conversely, it is possible to easily remove the arm member 15 from the arm support section 143. By this means, it is possible to reliably carry out an attachment and detachment of the arm member 15 to and from the arm fixing section 14 with a simple configuration. By this means, it is possible to easily and reliably carry out an assembly and disassembly of the arm member 15 and arm fixing section 14.

In the screen 1 of the embodiment, there is provided the legged support 20 which, abutting against an installation surface on which the screen 1 is installed, has the legs 21 which are connected to the support rod 16, and support the screen 1 upright. Consequently, the screen 1 is configured so that, by bringing the legged support 20 (the legs 21) into abutment with the installation surface by putting the legs 21 into the open condition, and supporting the screen 1 upright, it is possible to maintain a condition in which the screen 1 is stably installed.

Without being limited to the heretofore described embodiment, it is possible to implement the invention by making various alterations, improvements, or the like. Modification examples will be described hereafter.

Modification Example 1

In the heretofore described embodiment, the support sections 13 (the first support section 131 and second support section 132) support both left and right extreme sections of the screen main body 12. However, this not being limiting, it is also acceptable that the support sections 13 support both upper and lower extreme sections of the screen main body 12. Also, the support sections 13 are installed on the rear surface side of the screen main body 12, but it is acceptable that they are installed on the front surface side, and it is also acceptable that they are installed, facing each other, on both rear and front surface sides.

Modification Example 2

In the heretofore described embodiment, the second connection sections (for example, the engagement hole sections 1322 and 1323 acting as the second connection sections) are provided in each support section 13 (for example, the second support section 132), but it is also acceptable that the second connection sections are provided in portions of the screen main body 12 adjacent to each support section 13.

Modification Example 3

In the heretofore described embodiment, the spring member 1538 which enables the first connection section main body (the extension section 1534 of the connection section 1532) to protrude from one extremity of the third arm main body 1531 is included in the third arm member 153. However, this not being limiting, it is also acceptable that all the arm members 15 are configured of the other arm members 15 (the first arm member 151 and the like) which do not include the spring member 1538.

Modification Example 4

In the heretofore described embodiment, the arm member 15 (the third arm member 153) having the spring member 1538 is attached in the upper right direction of the arm fixing section 14 on the rear surface side of the screen 1. However, this not being limiting, it is also acceptable that the arm member 15 (the third arm member 153) having the spring member 1538 is attached in one of the four attachment directions.

Modification Example 5

In the heretofore described embodiment, the spring member 1538 is included in the third arm member 153 which is one arm member 15. However, this not being limiting, it is also acceptable that the spring member 1538 is included in two or more arm members 15.

Modification Example 6

In the heretofore described embodiment, four arm members 15 are used, but it is also acceptable to use five or more.

Modification Example 7

In the heretofore described embodiment, four arm members 15 are used, but it is also acceptable to use three. In this case, a configuration is also acceptable such that there are provided two on the left side and one on the right side with the arm fixing section 14 as a center. At this time, it is preferable that the one on the right side is provided in such a way that it can be connected to an approximate center in a longitudinal direction of the support section 13. Also, it is also acceptable to reverse the left and right configuration. By this means, it is possible to stably stretch the screen main body 12 with a smaller number of arm members 15. The same also applies to a case in which the support sections 13 are installed in the vertical direction of the screen main body 12.

Modification Example 8

In the heretofore described embodiment, a configuration is such that the third connection section (the engagement hole section 1531*a*) has the hole 1531*b* as the concavity, and the fourth connection section has the fixing spring 144 as the second spring member on which is formed the convexity 1442 coming into engagement with the concavity (the hole 1531*b*). However, this not being limiting, it is also acceptable that the third connection section has the third spring member on which the convexity is formed, and the fourth connection section has the concavity coming into engagement with the convexity. With this kind of configuration too, by utilizing the springiness of the third spring member included in the third connection section to bring the convexity formed on the third spring member into engagement with the concavity included in the fourth connection section, it is possible to securely fix the arm members to the arm support sections with a simple configuration. Conversely, it is possible to easily remove the arm members from the arm support sections. By this means, it is possible to reliably carry out the attachment and detachment of the arm members to and from the arm fixing section with a simple configuration.

Modification Example 9

In the heretofore described embodiment, the third connection section (the engagement hole section 1531*a*) has the hole 1531*b* as the concavity, but it is also acceptable that it is not formed as a hole, and it is sufficient that it is formed having a concave shape which comes into engagement with the convexity 1442.

What is claimed is:
1. A screen comprising:
a screen main body onto which an image light is projected;
a first and second support section which regulate and support both parallel extreme sections of the screen main body in a horizontal or vertical direction;
a support rod disposed in a central portion of the screen main body; and
four arm members which, being for holding the screen main body in a stretched condition, extend from the support rod to both extremities of each of the first and second support sections,
the four arm members have first connection sections, one at each of the first and second support section side extremities,
each of the first and second support sections includes at either extremity thereof a second connection section which receives the first connection section,
an attachment and detachment of each of the arm members to and from the screen main body is carried out by an attachment and detachment of the first connection section to and from the second connection section,
each of the four arm members has a third connection section at the support rod side extremity,
the support rod has fourth connection sections which receive, one each, the four arm members, and an attachment and detachment of the arm members to and from the support rod is carried out by the third connection sections and fourth connection sections coming into engagement,
wherein:
  one arm member of the four arm members has a first spring member which biases the main body of the first connection section of the one arm member in a direction along the one arm member from the first or second support side extremity of the one arm member, and
  the main bodies of the first connection sections of the other three arm members of the four arm members each extend to a fixed distance from the first or second support side extremity of each of the other three arm members.

2. The screen according to claim 1, wherein
each of the third connection sections has a concavity, and
each of the fourth connection sections has a second spring member on which is formed a convexity which comes into engagement with the concavity.

3. The screen according to claim 1, wherein
each of the third connection sections has a third spring member on which a convexity is formed, and
each of the fourth connection sections has a concavity which comes into engagement with the convexity.

4. The screen according to claim 1, further comprising:
a legged support which, abutting against an installation surface on which the screen is installed, has legs which, being connected to the support rod, support the screen upright.

* * * * *